(12) United States Patent
Hochwald et al.

(10) Patent No.: US 6,452,916 B1
(45) Date of Patent: Sep. 17, 2002

(54) SPACE-TIME SPREADING METHOD OF CDMA WIRELESS COMMUNICATION

(75) Inventors: Bertrand M. Hochwald; Thomas Louis Marzetta, both of Summit; Constantinos Basil Papadias, Madison, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/285,578

(22) Filed: Apr. 2, 1999

Related U.S. Application Data
(60) Provisional application No. 60/114,621, filed on Jan. 4, 1999.

(51) Int. Cl.[7] .............................................. H04B 7/216
(52) U.S. Cl. ....................... 370/342; 370/335; 375/141; 375/145
(58) Field of Search ................................. 370/320, 328, 370/329, 334, 335, 342, 441; 375/141, 145, 149; 455/506, 562

(56) References Cited

U.S. PATENT DOCUMENTS

| | | | |
|---|---|---|---|
| 5,822,359 A | * 10/1998 | Bruckert et al. | 370/342 |
| 5,970,058 A | * 10/1999 | DeClerk et al. | 370/329 |
| 6,072,778 A | * 6/2000 | Labedz et al. | 370/342 |
| 6,317,411 B1 | * 11/2001 | Whinnett et al. | 370/335 |

* cited by examiner

Primary Examiner—Nay Maung
(74) Attorney, Agent, or Firm—Martin I. Finston

(57) ABSTRACT

We describe a method for CDMA transmission of sets of data symbols to users that are organized into one or more user groups. Each user group is paired with a group of spreading codes, referred to as a "code group." Each set of data symbols that are destined for respective users of a given user group is transmitted in the form of two or more distinct signal sequences. Each such signal sequence is transmitted from a respective one of two or more transmitting antennas. Each signal sequence is a linear combination of spreading code sequences belonging to the corresponding code group. Within each of these linear combinations, each spreading code sequence that appears has a scalar coefficient. Each of these scalar coefficients is a linear combination of pertinent data symbols (i.e., data symbols destined for users in the given user group) or of complex conjugates of pertinent data symbols.

28 Claims, 5 Drawing Sheets

SPACE-TIME SPREADING METHOD OF CDMA WIRELESS COMMUNICATION

This application claims priority from provisional application No. 60/114,621, filed Jan. 4, 1999.

FIELD OF THE INVENTION

This invention relates to the use of spreading codes in CDMA systems for wireless communication. More particularly, the invention relates to methods for coding messages for transmission on the downlink, so as beneficially to use multiple transmitting antennas for improved reception in fading environments.

ART BACKGROUND

The quality of reception in wireless communication systems may suffer as a result of fluctuations in the propagation channel between the transmitting and receiving antennas. This phenomenon is referred to as "fading." In theory, reception in fading environments can be improved by using multiple antennas at the transmitting or receiving end, or both, of the communication link. Multiple antennas can help by providing multiple, independent paths between the ends of the link. The existence of such independent paths is referred to as "diversity."

There has been recent interest in applying such diversity to boost the capacity and data rate of CDMA systems.

In regard to mobile telephone systems in general, and CDMA systems in particular, spatial as well as economic limitations make it more practical to install multiple antennas at the base station rather than the mobile stations. On the uplink of CDMA systems (i.e., from the mobile to the base station), multiple base-station antennas have in fact been advantageously used to improve data rates and reduce error probabilities. However, it has proven more difficult to attain the desired benefits of diversity in the downlink direction. Previously proposed schemes have tended to provide relatively little diversity gain (i.e., improved reception due to improvement in the statistical distribution of the instantaneous signal-to-noise ratio at the mobile), or they have called for the consumption of too many resources, or they have entailed substantial changes to existing CDMA standards.

Some of the limitations of these previously proposed schemes will be illustrated in the following example. In this example, we will describe, in simplified terms, the processing of data symbols at the baseband level, in accordance with CDMA procedures. We will focus on the modulation of spreading codes by the data symbols, in accordance with well-known procedures. We will not discuss the precise spreading codes to be used, nor will we discuss the gains or pulse shapes. Those skilled in the art will appreciate that these details, as well as methods for placing the coded signals onto carrier waves and transmitting them, are well known.

In our simplified example, there are only two users. We treat the sending of one respective real-valued, scalar data symbol to each user over a physical propagation channel that is free of multipath effects, so that it is adequately modeled by one fading (i.e., propagation) coefficient for each user.

Thus, with reference to FIG. 1, base station 10 is to transmit real-valued scalar data symbols $b_1$ and $b_2$ to users U1 (reference numeral 15.1) and U2 (reference numeral 15.2), respectively. There are provided two orthonormal spreading codes, denoted by vectors $c_1$ and $c_2$. In our simplified example, data symbol $b_1$ multiplies code $c_1$, and data symbol $b_2$ multiplies code $c_2$.

In typical CDMA communications, a single base-station antenna transmits the vector sum $b_1c_1+b_2c_2$, where the scalar elements of the vector sum are transmitted consecutively at the rate commonly known as the chip rate. Then the received baseband signal at U1 is given by $r_1=h_1(b_1c_1+b_2c_2)+n_1$, and similarly, at U2, $r_2=h_2(b_1c_1+b_2c_2)+n_2$, where $h_1$ and $h_2$ are the respective fading (i.e., propagation) coefficients (with subscripts that relate to the respective users), and $n_1$ and $n_2$ are respective components of additive receiver noise.

Despreading of the received signal by each mobile station is represented mathematically as left-multiplication by the complex transpose of the respective spreading code belonging to that base station. After this operation, the respective received signals $d_1$ and $d_2$ are given by: $d_1=h_1b_1+v_1$, $d_2=h_2b_2+v_2$, where $v_1=c_1^\dagger n_1$, $v_2=c_2^\dagger n_2$, and "$\dagger$" denotes conjugate transposition.

For effective recovery of the data symbols, it is advantageous for the mobile receiver to know the pertinent fading coefficient from, e.g., measurement of a pilot signal. It is also desirable, for this purpose, to have a relatively high channel gain (i.e., the absolute magnitude of the pertinent fading coefficient). This condition cannot be guaranteed, in general. Below, we describe an exemplary scheme for using diversity to increase the likelihood that the instantaneous signal-to-noise ratio will be high enough to support reliable communication. For simplicity, we assume that there are only two transmitting antennas, and that they are separated by a distance of several wavelengths, so that their respective paths to users are, to a substantial degree, statistically independent.

It should be noted in this regard that the fading coefficients are not fixed quantities, but instead are described probabilistically, in terms of appropriate statistical distributions. Here, we will present certain analytical results assuming that the fading coefficients are complex-Gaussian variables having Rayleigh-distributed amplitude and uniformly distributed phase. We also assume that the additive receiver noise is zero-mean complex-Gaussian.

Under these assumptions, the squared magnitude of the individual fading coefficient $h_1$ or $h_2$ has a chi-square distribution with two degrees of freedom, which arise from the squares of the respective real and imaginary parts of the fading coefficients. In general, the sum of squares of M independent, zero-mean, Gaussian random variables, each with unit variance, has the chi-square distribution with M degrees of freedom. If the squared magnitude of the effective fading coefficient is proportional to a chi-square random variable with 2M degrees of freedom, we say that the diversity is "M-fold." Diversity is useful in the context of CDMA transmission because increased diversity results in a probability density for the signal-to-noise ratio that is more sharply peaked about its mean value. As a consequence, there is less likelihood that the signal-to-noise ratio will fall into the range of values so low that dependable communication is precluded.

Continuing our simplified model, suppose now that each antenna of a two-antenna array transmits the baseband signal $$\left(\frac{1}{\sqrt{2}}\right)(b_1c_1+b_2c_2),$$

where the normalizing factor of $$\left(\frac{1}{\sqrt{2}}\right)$$

signifies that the total transmitted power is the same as for the single-antenna case. The signal $d_k$ received at the k'th mobile (k=1,2), after despreading, is given by $$d_k = \left(\frac{1}{\sqrt{2}}\right)(h_1^{(k)} + h_2^{(k)})b_k + v.$$

In this expression, $h_1^{(k)}$ and $h_2^{(k)}$ are the complex-Gaussian channel gains from antenna 1 and antenna 2, respectively, to user (i.e., mobile station) k, assuming, again, that there are no multipath effects. To simplify notation, we drop the subscript k (i.e., the user index) from the pre-despreading received noise terms n and the post-despreading noise terms v. It should be noted that here, and in the following discussion, the subscripts of the fading coefficients relate to the respective antennas, and not to the respective users.

If the two antennas are widely separated, the respective fading coefficients are statistically independent, and therefore their sum $$\left(\text{normalized by a factor of } \frac{1}{\sqrt{2}}\right)$$

has the same statistical distribution as either of them individually. As a consequence, little or no diversity gain is afforded by this scheme.

Next, with reference to FIG. 2, suppose that user 1 (denoted in the figure by reference numeral 20.1) and user 2 (denoted by reference numeral 20.2) are each assigned a respective orthogonal spreading code for each of the two antennas, so that there are four codes in all. (The antennas are respectively denoted in the figure by reference numerals 25.1 and 25.2.) Thus, the baseband signal transmitted on antenna m (m=1, 2) is given by $$\left(\frac{1}{\sqrt{2}}\right)(b_1 c_{m1} + b_2 c_{m2}),$$

and the received signal $r_k$ (before despreading) at the k'th mobile is given by $$r_k = \left(\frac{1}{\sqrt{2}}\right)[h_1^{(k)}(b_1 c_{11} + b_2 c_{12}) + h_2^{(k)}(b_1 c_{21} + b_2 c_{22})] + n.$$

User k separately despreads $c_{1k}$ and $c_{2k}$, to get the effective received signals $d_k^{(1)}$ and $d_k^{(2)}$, which are given by:

$$d_1^{(k)} = \left(\frac{1}{\sqrt{2}}\right)h_1^{(k)}b_k + c_{1k}^\dagger n, \quad d_k^{(2)} = \left(\frac{1}{\sqrt{2}}\right)h_2^{(k)}b_k + c_{2k}^\dagger n.$$

It should be noted that in these expressions, the symbols $d_k^{(1)}$ and $d_k^{(2)}$ are subscripted to indicate a respective user, and superscripted to indicate a respective spreading code. A notational convenience is introduced by defining $$d_k = \begin{bmatrix} d_k^{(1)} \\ d_k^{(2)} \end{bmatrix}, \quad h^{(k)} = \begin{bmatrix} h_1^{(k)} \\ h_1^{(k)} \end{bmatrix}, \quad \vec{v} = \begin{bmatrix} c_{1k}^\dagger n \\ c_{2k}^\dagger n \end{bmatrix}.$$

Then in matrix notation, the despread signals are represented by:

$$d_k = \left(\frac{1}{\sqrt{2}}\right)h^{(k)} b_k + \vec{v}.$$

Diversity gain is achieved (for user k) when the 2×1 matrix $d_k$ is multiplied on the left by $h^\dagger$, obtaining $$h^\dagger d_k = \left(\frac{1}{\sqrt{2}}\right)(|h_1|^2 + |h_2|^2)b_k + h^\dagger \vec{v}.$$

The superscript (k) has been dropped from the preceding expression to simplify the notation.

It should be noted that the preceding mathematical expression was formulated with a particular normalization chosen for conciseness and simplicity. Those skilled in the art will appreciate that there are alternative normalizations having particular utility, such as those that make the additive noise variance equal to unity.

Because the statistical distribution of $(|h_1|^2+|h_2|^2)$ has a chi-square distribution for which 2M equals four degrees of freedom, a twofold diversity gain is achieved over the single-antenna case. In fact, this gain is achieved without requiring either user to decode the other user's symbol.

However, this diversity gain is achieved only with a substantial penalty: there must be two spreading codes per user. More generally, if there are M transmitter antennas, then there must be M codes per user. If the total number of available codes is limited, then M times fewer simultaneous users can be supported than in the single-antenna case.

Thus, there remains a need for a scheme to achieve the full benefits of diversity when multiple transmitter antennas are used, but without incurring a substantial penalty in the number of codes that must be assigned per user.

SUMMARY OF THE INVENTION

We have discovered such a scheme.

To illustrate our scheme, we first discuss a case in which, as above, our simplified model applies, there are two transmitter antennas and two users, and the data symbols to be transmitted are real-valued. (As noted, there are no multipath effects in our simplified model. As discussed below, our scheme is readily extended to apply to multipath propagation environments.)

With reference to FIG. 3, antenna 1 (denoted by reference numeral 25.1) transmits the signal $$\left(\frac{1}{\sqrt{2}}\right)(b_1 c_1 + b_2 c_2),$$

and antenna 2 (denoted by reference numeral 25.2) transmits the signal $$\left(\frac{1}{\sqrt{2}}\right)(b_2 c_1 - b_1 c_2).$$

Thus, only two spreading codes are used, but both codes are used for the data symbol destined for user 1, and both codes are also used for the data symbol destined for user 2. (The users are respectively denoted in the figure by reference numerals 20.1 and 20.2.) User k despreads the received signals, using each of the respective spreading codes, to obtain received signals $d_k^{(1)}$ and $d_k^{(2)}$, given by $$d_k^{(1)} = \left(\frac{1}{\sqrt{2}}\right)(h_1^{(k)}b_1 + h_2^{(k)}b_2) + c_1^\dagger n,$$

$$d_k^{(2)} = \left(\frac{1}{\sqrt{2}}\right)(-h_2^{(k)}b_1 + h_1^{(k)}b_2) + c_2^\dagger n.$$

Let $d_k$ and $\vec{v}$ be defined as above, and let the fading coefficients be gathered into a matrix H according to:

$$H = \begin{bmatrix} h_1 & h_2 \\ -h_2 & h_1 \end{bmatrix}.$$

To simplify the notation, the superscript (k) is dropped here, and in the rest of this discussion. Let the k'th column of H be denoted $\vec{h}_k$, k=1, 2, and let the k'th row of $H^\dagger$ be denoted $\vec{h}_k^\dagger$, k=1, 2. Then to recover the symbol $b_k$, k=1, 2, from the received signal vector $d_k$, the receiver left-multiplies $d_k$ by the conjugate transpose of $\vec{h}_k$, and takes the real part of the result:

$$\operatorname{Re}\left(\vec{h}_k^\dagger d_k\right) = \left(\frac{1}{\sqrt{2}}\right)(|h_1|^2 + |h_2|^2)b_k + \operatorname{Re}\left(\vec{h}_k^\dagger \vec{v}\right).$$

The symbol $b_k$ is then ready for hard or soft decoding, according to well-known techniques of CDMA signal processing.

In FIG. 3, symbol recovery using the first row of $H^\dagger$ is represented by blocks 30.1 and 35.1, and symbol recovery using the second row of $H^\dagger$ is represented by blocks 30.2 and 35.2.

We have described a two-fold diversity coding scheme in which a given user does not need to know the symbol destined for any other user. User k despreads the raw received signal using each of spreading codes $c_1$ and $c_2$, left-multiplies the despread signal vector by the k'th row of $H^\dagger$, and takes the real part of the resulting scalar. One advantage of this scheme is that no extra spreading codes are required. (As will be seen, however, certain extensions of this scheme may require a set of spreading codes that is larger than the corresponding set of users.)

The scheme described above is readily extended to serve K users, K an even number greater than 2. Form K/2 pairs of users, such that user k is paired with user k+1, k=1, 3, 5, . . . , K−1. On antenna 1, transmit the signal $$\frac{1}{\sqrt{2}}\sum_{k=1}^{K/2}(b_{2k-1}c_{2k-1} + b_{2k}c_{2k}) = \frac{1}{\sqrt{2}}\sum_{k=1}^{K} b_k c_k,$$

and on antenna 2, transmit the signal $$\frac{1}{\sqrt{2}}\sum_{k=1}^{K/2}(b_{2k}c_{2k-1} - b_{2k-1}c_{2k}).$$

Each mobile user despreads the incoming signal with the two spreading codes that it shares with the companion that has been paired with it. The processing of the despread signals is as described above.

The schemes described apply when there are two transmitter antennas, there are two users per user group, and the data symbols $b_k$ are real-valued. In fact, our technique can be extended to apply to greater numbers of transmitter antennas, and to groups of more than two users. Our technique can also be extended to apply when the data symbols are complex-valued. We will describe such extensions below.

It should be noted that we are assuming, for the time being, that there is only one effective path from each transmitting antenna to each user. As will be seen, our approach is readily extended to the case of multiple paths, typically associated with delay spread, from each antenna to each user.

Thus, in one broad aspect, our invention involves a method for CDMA transmission of sets of data symbols to users that are organized into one or more user groups. Each user group is paired with a group of spreading codes, referred to as a "code group." Each set of data symbols that are destined for respective users of a given user group is transmitted in the form of two or more distinct signal sequences. Each such signal sequence is transmitted from a respective one of two or more transmitting antennas. Each signal sequence is a linear combination of spreading code sequences belonging to the corresponding code group. Within each of these linear combinations, each spreading code sequence that appears has a scalar coefficient. Each of these scalar coefficients is a linear combination of pertinent data symbols (i.e., data symbols destined for users in the given user group) or of complex conjugates of pertinent data symbols.

In a second broad aspect, our invention involves a method for CDMA reception of data symbols belonging to such sets. A user belonging to a given user group despreads a received signal sequence using each spreading code sequence in the code group paired with the given user group. A linear combination is formed of the resulting, respective despread scalar signal values. Each scalar signal value in this linear combination has a scalar coefficient. Each of these scalar coefficients is a linear combination of fading coefficients or of complex conjugates of fading coefficients. The result of this sequence of operations is proportional to the desired data symbol.

DETAILED DESCRIPTION

In the following discussion, M represents the number of transmitting antennas, K represents the total number of users, and L represents the total number of spreading codes used.

We have found that the method described above can be extended to more than two transmitting antennas, and to more than two users (per user group). However, certain constraints apply.

The total number L of spreading codes must be at least the total number K of users. For economy in the use of spreading codes, it is advantageous for these numbers to be equal whenever possible. When the number M of antennas is 2, it is possible to have L=K, as described above. However, this is not necessarily the case if there are more than two antennas.

Figure 1:
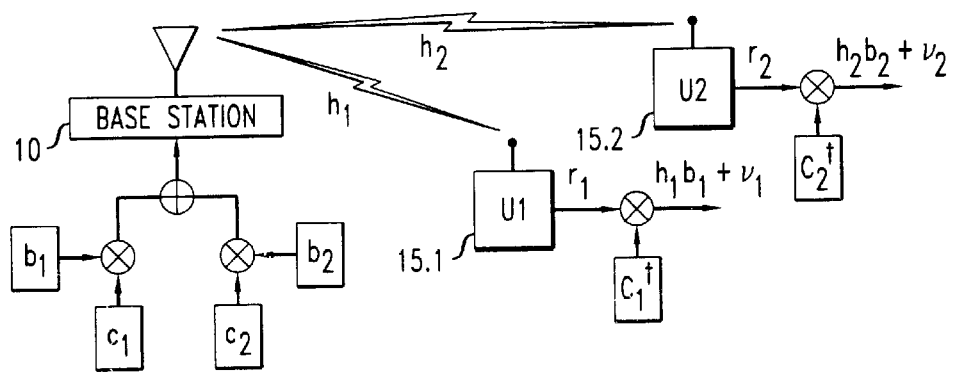
FIG. 1 is a simplified, schematic block diagram of a CDMA system for transmission from a base station to users, which are typically mobile stations.
Figure 2:
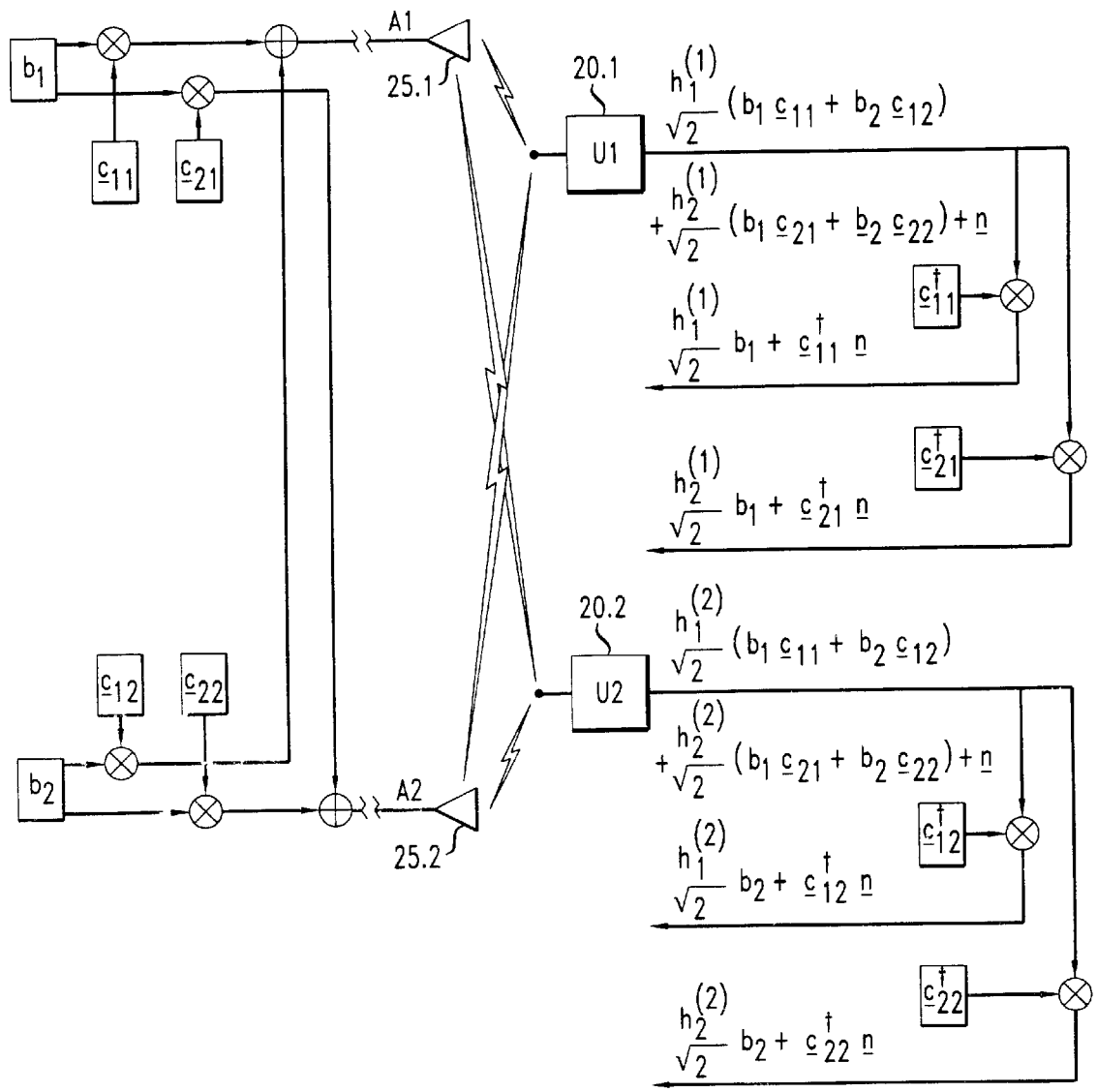
FIG. 2 is a schematic block diagram of a multiple-antenna transmission system of the prior art.
Figure 3:
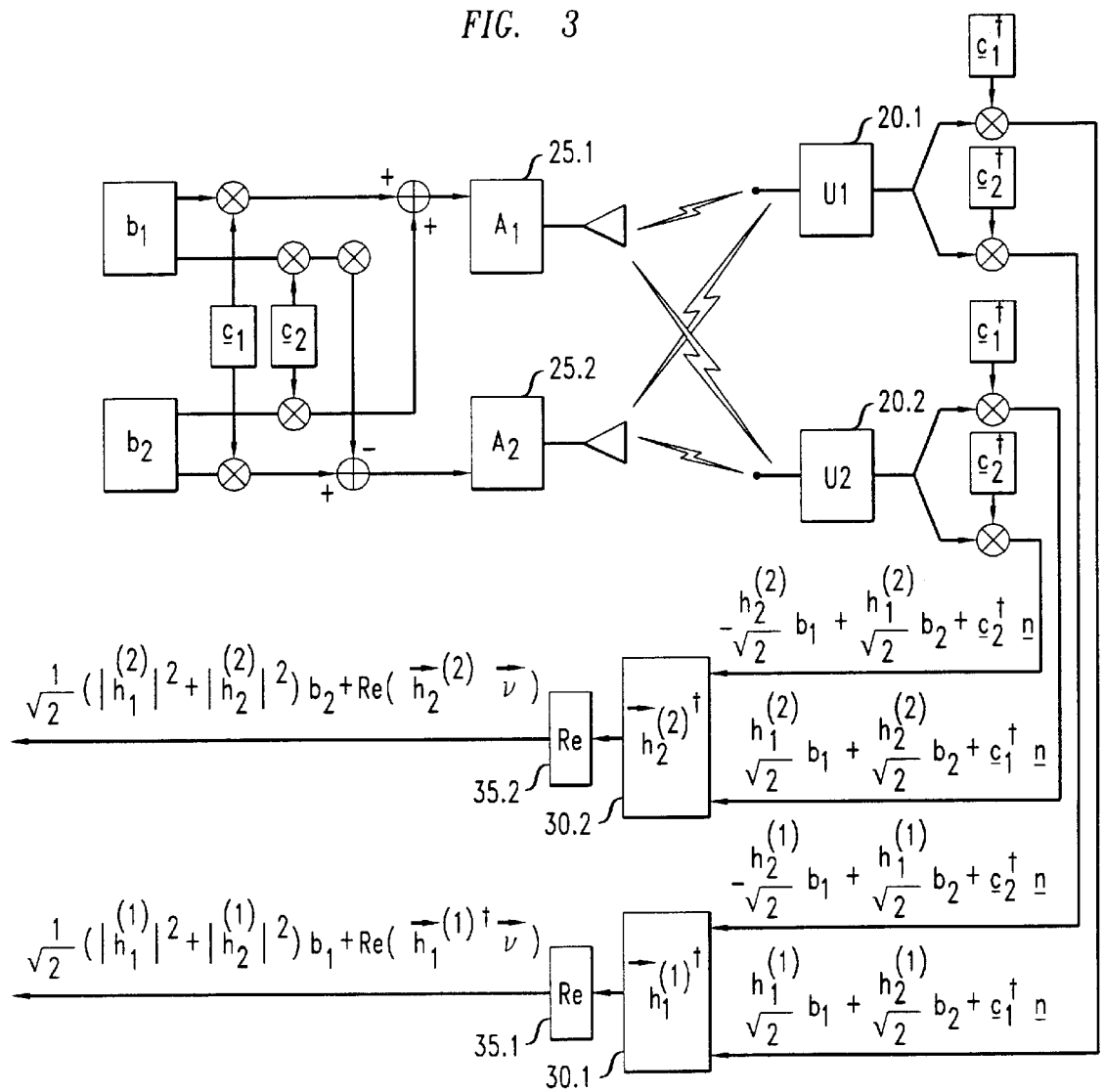
FIG. 3 is a schematic block diagram of an illustrative, two-antenna transmission system according to the invention in one embodiment.
Figure 4:
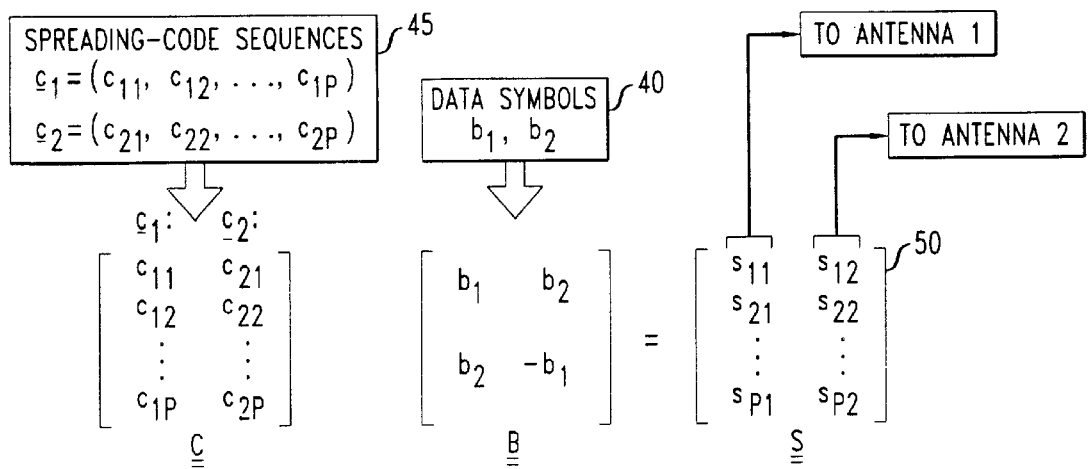
FIG. 4 is a conceptual illustration of the relationship between spreading-code sequences, data symbols, and the baseband signal matrix to be transmitted, according to the invention in an illustrative embodiment.

Turning to FIG. 4 and referring back to the preceding example (in which, significantly, the data symbols are real-valued), we now gather the data symbols 40 that are to be transmitted into a matrix B, defined by $$B = \begin{bmatrix} b_1 & b_2 \\ b_2 & -b_1 \end{bmatrix},$$

and we gather the spreading-code sequences 45 that are to be used into a matrix C defined by $C=[c_1 \ c_2]$. If P is the length of the spreading-code sequences, then the signal 50 to be transmitted (in baseband representation) may be represented as a P×2 matrix S given by S=CB. (For simplicity, we are here omitting a constant normalizing factor.) The k'th column of B contains the data symbols that are to be coded for transmission from the k'th antenna, and the k'th column of S is the spread symbol to be transmitted from the k'th antenna. The i'th row of S is the baseband representations of the signals for the respective antennas at chip i of the code sequences.

Figure 5:
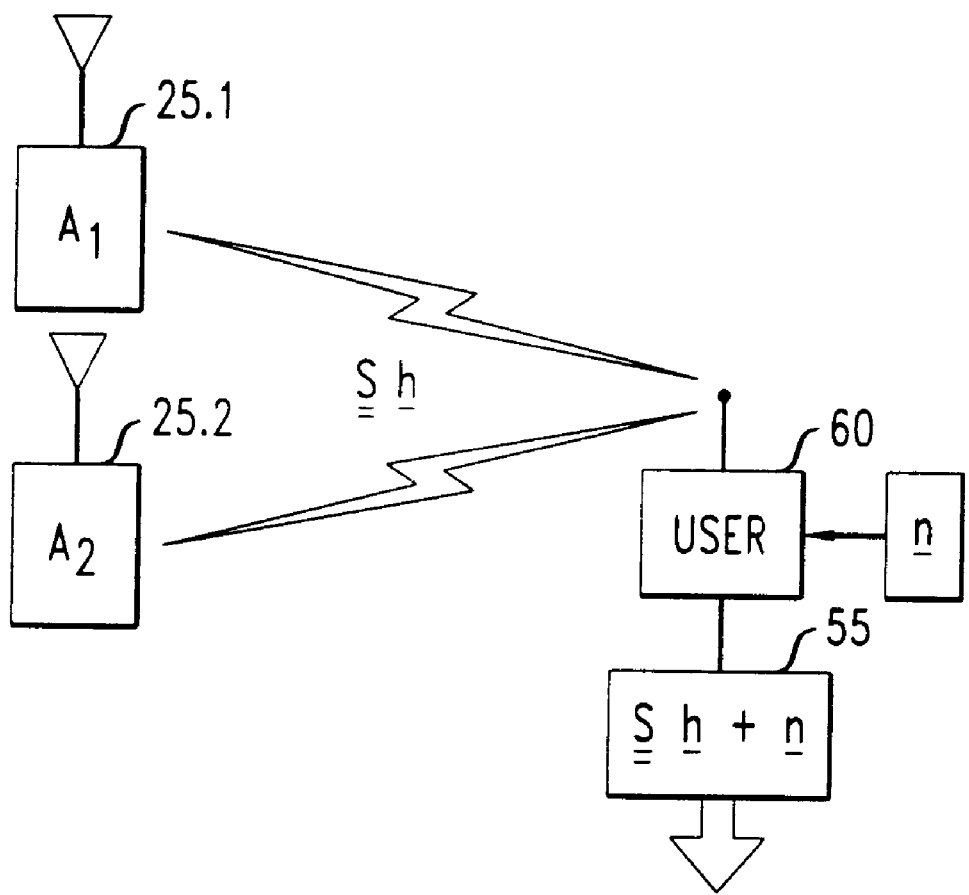
FIG. 5 is a conceptual illustration of the process of despreading a basebanded, received signal according to the invention in an illustrative embodiment.

With reference to FIG. 5, the raw, basebanded signal 55 received at the mobile user 60 is Sh+n, which is equal to CBh+n. (The properties of the physical transmission channel are represented by the vector h.) This signal is despread by left-multiplying it by $C^\dagger$ (which may also be written $$\begin{bmatrix} c_1^t \\ c_2^t \end{bmatrix}):$$

$C^\dagger(Sh+n)=Hb+\vec{v}$. (We have here used the definition $$b = \begin{pmatrix} b_1 \\ b_2 \end{pmatrix}$$

and the important fact that Bh=Hb.) Finally, the k'th mobile user decodes its symbol by left-multiplying the despread signal by the k'th row of $H^\dagger$ and taking the real part, as described above.

We will now describe rules for constructing B and H such that these relations for coding, despreading, and recovery of transmitted data symbols can be applied, for real-valued data symbols, when the number of antennas is greater than two.

Let the K users be grouped into K/K' user groups of K' users each, and to each user group, assign L' spreading codes, where L' is at least K'. (For a given number of antennas, it is desirable to make L' as close as possible to K'.)

Let the vector h represent the M fading coefficients from the respective transmitting antennas to the k'th mobile user. (As above, the subscript or superscript indicating the user index k is omitted to simplify the notation.) Thus:

$$h = \begin{bmatrix} h_1 \\ \vdots \\ h_M \end{bmatrix}.$$

Let the vector b represent the K' data symbols destined for respective users in a given user group:

$$b = \begin{bmatrix} b_1 \\ \vdots \\ b_{K'} \end{bmatrix}.$$

Let B be an L'×M matrix, each entry of which is a linear combination of data symbols, and let H be an L40 ×K' matrix, each entry of which is a linear combination of fading coefficients.

Rule 1: Each column of the K' columns of H is generated by left-multiplying h with an L'×M matrix $A_j$, which we refer to as an H-generator matrix. Thus, $H=[A_1 h \ A_2 h \ \ldots \ A_{K'} h]$. Without excluding other possibilities, we note here that in examples we have studied, the H-generator matrices are real-valued.

Rule 2: Each H-generator matrix $A_i$ satisfies the relation $A_i^T A_i = I$, where I is the M×M identity matrix, and if i≠j, then $A_i^T A_j$ is a skew-symmetric matrix. (I.e., $A_i^T A_j = -(A_i^T A_j)^T$.)

Rule 3: Each column of the M columns of B is generated by left-multiplying b with an L'×K' matrix $\tilde{A}_1$, which we refer to as a B-generator matrix. Thus, $B=[\tilde{A}_1 b \ \tilde{A}_2 b \ \ldots \ \tilde{A}_M b]$.

Rule 4: Each B-generator matrix has the same skew-symmetry and transpose-inverse properties as the H-generator matrices. Moreover, the j'th column of matrix $\tilde{A}_i$ is the same as the i'th column of matrix $A_j$.

One important consequence of Rules 1–4 is that Bh=Hb. Moreover, $H^T H=(h_1^2+h_2^2+\ldots+h_M^2)I$ (where I is the K'×K' identity matrix), and $B^T B=(b_1^2+b_2^2+\ldots+b_{K'}^2)I$ (where I is the M×M identity matrix).

When Rule 1 applies and the H-generator matrices are real-valued, the property that $H^T H=(h_1^2+h_2^2+\ldots+h_M^2)I$ is a sufficient condition for the further property that $Re(H^\dagger H)=[|h_1|^2+|h_2|^2+\ldots+|h_M|^2]I$. The latter property is significant for symbol recovery, as described above.

Another important consequence is that the B-generator matrices are readily derived from the H-generator matrices, and vice versa.

Yet another important consequence is that given a set of generator matrices, the transmitter can readily construct B, and the receiver (assuming that it has determined the pertinent fading coefficients) can readily construct H.

Figure 6:
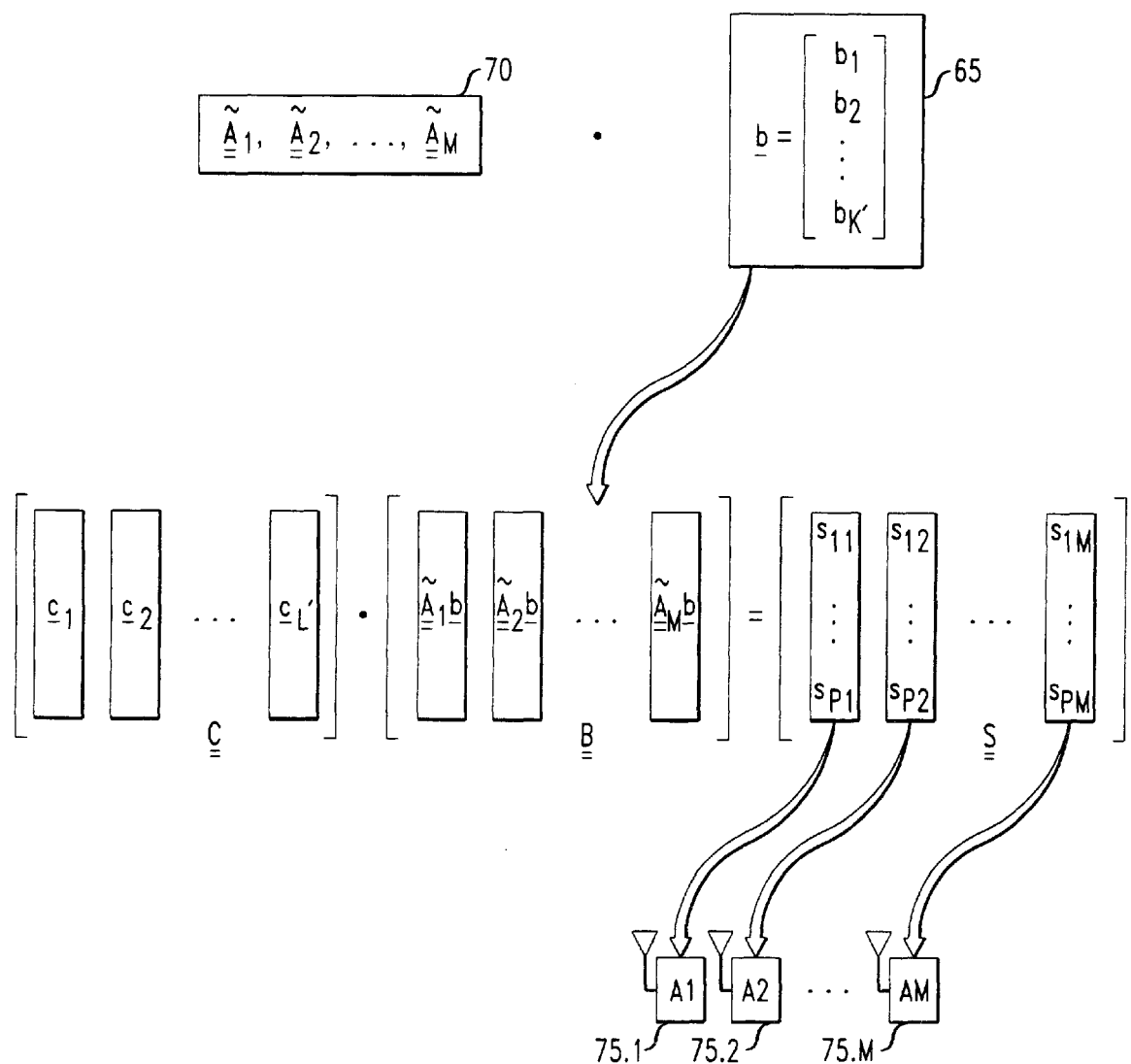
FIG. 6 is a conceptual illustration of the construction of a baseband signal matrix for transmission according to the invention in an illustrative embodiment.

FIG. 6 shows a matrix B constructed from a vector b (denoted in the figure by reference numeral 65) by applying B-generator matrices (denoted by reference numeral 70) in accordance with the above Rules 1–4. Given such a matrix B, the matrix S of signals to be transmitted is given, as above, by S=CB, where, now, $C=[c_1 \ c_2 \ \ldots \ c_{L'}]$. (Those skilled in the art will appreciate that the preceding expression should include proper normalization, which is here omitted for conciseness and simplicity.) Each column of S provides the spread symbol to be transmitted from a respective one of antennas 75.1–75.M.

In general, to attain M-fold diversity for all K users in a CDMA system, it is advantageous to first choose a particular size for the code groups; i.e., a particular number L' of spreading codes to be assigned per user group. (As noted, L' must be at least the number K' of users per user group.) Then, the K users are segregated into user groups of K' users each, and each group applies its code group of L' spreading codes, as explained above. Each mobile user must know which spreading codes belong to its code group, and it must despread in accordance with them. The despreader will typically be a Rake receiver, which is well-known in the art. Generally, residual users that do not form a complete group of K' users will still need to apply a full code group of L' spreading codes.

The diversity gain theoretically achievable through our technique may be described in terms of the fading-dependent signal-to-noise ratio. In the one-antenna case, this ratio is proportional to $|h|^2$; in the two-antenna case, to $$\frac{|h_1|^2 + |h_2^2|}{2};$$

and in the M-antenna case, to $$\frac{|h_1|^2 + \cdots + |h_M^2|}{M},$$

with the same proportionality factor in each case.

Figure 7:
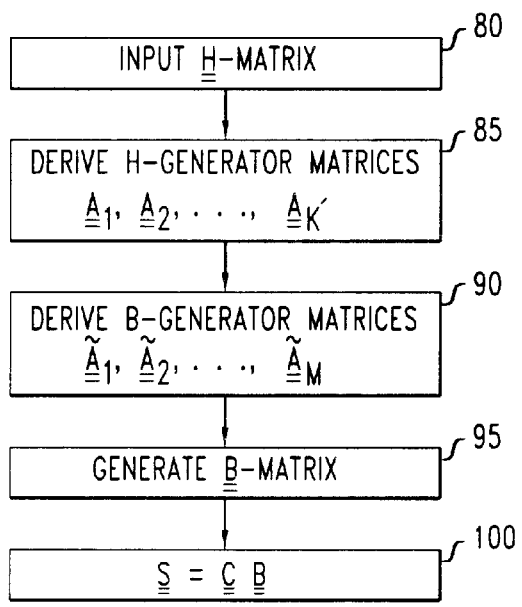
FIG. 7 is a flowchart of an exemplary procedure for constructing a baseband signal matrix for transmission.

To design M-fold diversity transmitter signals that have simple decoding algorithms, we may start with a design for B or, alternatively, for H. In at least some cases, it will be advantageous to begin the design with H because the mobile (i.e., the receiver) generally faces the strictest constraints on processing power and complexity. In FIG. 7, a signal-design procedure is shown that begins by providing, at block 80, a matrix H as input.

For example, the matrix $$H = \begin{bmatrix} h_1 & h_2 & h_3 & h_4 \\ -h_2 & h_1 & -h_4 & h_3 \\ -h_3 & h_4 & h_1 & -h_2 \\ -h_4 & -h_3 & h_2 & h_1 \end{bmatrix}$$

is useful for achieving an L'=K'=M=4 diversity scheme. (It should be noted that each column of this matrix consists of a respective permutation of all of the pertinent fading coefficients, each multiplied by +1 or −1. Although the H matrices need not be of this form, in general, such a form will often be useful.)

To construct B, first derive $A_1, \ldots, A_4$ from H to obtain:

$$A_1 = \begin{bmatrix} 1 & 0 & 0 & 0 \\ 0 & -1 & 0 & 0 \\ 0 & 0 & -1 & 0 \\ 0 & 0 & 0 & -1 \end{bmatrix}, A_2 = \begin{bmatrix} 0 & 1 & 0 & 0 \\ 1 & 0 & 0 & 0 \\ 0 & 0 & 0 & 1 \\ 0 & 0 & -1 & 0 \end{bmatrix},$$

-continued $$A_3 = \begin{bmatrix} 0 & 0 & 1 & 0 \\ 0 & 0 & 0 & -1 \\ 1 & 0 & 0 & 0 \\ 0 & 1 & 0 & 0 \end{bmatrix}, A_4 = \begin{bmatrix} 0 & 0 & 0 & 1 \\ 0 & 0 & 1 & 0 \\ 0 & -1 & 0 & 0 \\ 1 & 0 & 0 & 0 \end{bmatrix}.$$

This yields $$\tilde{A}_1 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \tilde{A}_2 = \begin{bmatrix} 0 & 1 & 0 & 0 \\ -1 & 0 & 0 & 0 \\ 0 & 0 & 0 & -1 \\ 0 & 0 & 1 & 0 \end{bmatrix},$$

$$\tilde{A}_3 = \begin{bmatrix} 0 & 0 & 1 & 0 \\ 0 & 0 & 0 & 1 \\ -1 & 0 & 0 & 0 \\ 0 & -1 & 0 & 0 \end{bmatrix}, \tilde{A}_4 = \begin{bmatrix} 0 & 0 & 0 & 1 \\ 0 & 0 & -1 & 0 \\ 0 & 1 & 0 & 0 \\ -1 & 0 & 0 & 0 \end{bmatrix},$$

which leads to:

$$B = \begin{bmatrix} b_1 & b_2 & b_3 & b_4 \\ b_2 & -b_1 & b_4 & -b_3 \\ b_3 & -b_4 & -b_1 & b_2 \\ b_4 & b_3 & -b_2 & -b_1 \end{bmatrix}.$$

In FIG. 7, the H-generator matrices are shown as derived in block 85, the B-generator matrices are shown as derived in block 90, and the matrix B is shown as generated at block 95.

The transmitted S matrix signal across the four antennas is therefore $$S = \begin{bmatrix} c_1 & c_2 & c_3 & c_4 \end{bmatrix} \begin{bmatrix} b_1 & b_2 & b_3 & b_4 \\ b_2 & -b_1 & b_4 & -b_3 \\ b_3 & -b_4 & -b_1 & b_2 \\ b_4 & b_3 & -b_2 & -b_1 \end{bmatrix}.$$

In FIG. 7, the construction of the matrix S is shown at block 100.

To adapt this M=4 diversity scheme to M=3 antennas, replace $h_4$ with zero in the H matrix given above, and proceed as before. As a result, B loses its last column, or $$B = \begin{bmatrix} b_1 & b_2 & b_3 \\ b_2 & -b_1 & b_4 \\ b_3 & -b_4 & -b_1 \\ b_4 & b_3 & -b_2 \end{bmatrix}.$$

Whether M=3 or M=4, we observe that we have L'=K'=4, and we therefore do not need extra spreading codes to achieve three- or four-fold diversity at each mobile.

It would be reasonable to ask whether, when M=3, it is possible to achieve L'=K'=3, so that each mobile could achieve three-fold diversity by despreading only three codes. The answer is that this is not a possible solution. In this case, H would be required to be a square 3×3 matrix whose columns form an orthogonal design in three variables. It is known that such designs do not exist. In fact, square designs for which L'=K'=M exist only for M=2, 4, or 8.

The examples given above are applicable when the data symbols $b_1, \ldots, b_{K'}$ are real-valued. We will now provide examples that are applicable when the data symbols are complex-valued. These examples will show that M-fold diversity is achievable, although it may be necessary to use extra spreading codes (i.e., L'>K') if M>2. In order to accommodate complex symbols, we now require that H obey $$H \dagger H = (|h_1|^2 + \ldots + |h_M|^2)I.$$

First, let M=2; here we can attain full diversity with L'=K'=2.

For M=2, the matrix $$H = \begin{bmatrix} h_1 & h_2 \\ -h_2^* & h_1^* \end{bmatrix}$$

satisfies the above requirement on H†H.
However, it is evident from the product $$Hb = \begin{bmatrix} h_1 & h_2 \\ -h_2^* & h_1^* \end{bmatrix} \begin{bmatrix} b_1 \\ b_2 \end{bmatrix} = \begin{bmatrix} h_1 b_1 + h_2 b_2 \\ -h_2^* b_1 + h_1^* b_2 \end{bmatrix}$$

that there is no B for which Hb=Bh. Instead, therefore, the second entry of the above product vector is conjugated, to obtain:

$$\begin{bmatrix} h_1 b_1 + h_2 b_2 \\ -h_2 b_1^* + h_1 b_2^* \end{bmatrix} = \begin{bmatrix} b_1 & b_2 \\ b_2^* & -b_1^* \end{bmatrix} \begin{bmatrix} h_1 \\ h_2 \end{bmatrix} = Bh, \text{ where } B = \begin{bmatrix} b_1 & b_2 \\ b_2^* & -b_1^* \end{bmatrix}.$$

Thus, it is evident that the transmitted signal should be $$S = CB = \begin{bmatrix} c_1 & c_2 \end{bmatrix} \begin{bmatrix} b_1 & b_2 \\ b_2^* & -b_1^* \end{bmatrix}.$$

As in the case of real-valued symbols, the mobile despreads the received baseband signal with $C^\dagger$, to give $$C^\dagger (Sh + n) = Bh + \begin{bmatrix} c_1^\dagger n \\ c_2^\dagger n \end{bmatrix}.$$

However, unlike the real-symbol case, the second entry of the result is now conjugated to yield $$Hb + \begin{bmatrix} c_1^\dagger n \\ (c_2^\dagger n)^* \end{bmatrix}.$$

The k'th user now extracts its data symbol by multiplying on the left by the k'th row of $H^\dagger$. Unlike the real-symbol case, both the real and imaginary parts of the result carry information. This achieves L'=K'=M=2.

We now describe an exemplary scheme in which M=3, K'=3, and L'=4. We thus attain three-fold diversity by pairing groups of three users with four spreading codes.

The transmitted B matrix is $$B = \begin{bmatrix} b_1 & -b_2 & -b_3 \\ b_2^* & b_1^* & 0 \\ b_3^* & 0 & b_1^* \\ 0 & -b_3^* & b_2^* \end{bmatrix}.$$

The mobile, after despreading the received signal with $C^\dagger$, conjugates the second, third, and fourth entries of the resulting vector to obtain $$H = \begin{bmatrix} h_1 & -h_2 & -h_3 \\ h_2^* & h_1^* & 0 \\ h_3^* & 0 & h_1^* \\ 0 & h_3^* & -h_2^* \end{bmatrix}.$$

It is evident that $H^\dagger H = (|h_1|^2 + |h_2|^2 + |h_3|^2)I$, and thus the desired three-fold diversity is achieved.

In the preceding discussion, it has been assumed that a propagation model applies in which there is only one effective path from each transmitting antenna to the receiving station. When multiple paths are of significance, each is typically characterized by its own time delay and its own fading coefficient. Well-known techniques for multipath reception are readily combined with the reception technique that we have described here.

For example, a simple extension of our reception technique is readily applied by, e.g., a Rake receiver, if each time delay is common to one path from each antenna, so that each time delay defines one path set from the transmitting antenna array. (This is a reasonable assumption whenever the alternative paths diverge on a spatial scale that is large relative to the size of the array.) In that case, the despreading procedure is applied separately to the signal received on each path set, to produce a multiplicity of terms of the form $$H_l \begin{bmatrix} b_1 \\ b_2 \end{bmatrix}$$

(plus interference and noise terms). (That is, the Rake receiver implements a separate H matrix for each of the time delays.) Here, the index l ranges over all of the path sets. Symbol recovery is carried out, as described above, by applying the desired row of $H_l^\dagger$ to each of these terms and taking the real part. Then, the resulting terms are summed over all the path sets to obtain the recovered symbol.

EXAMPLE

Figure 8:
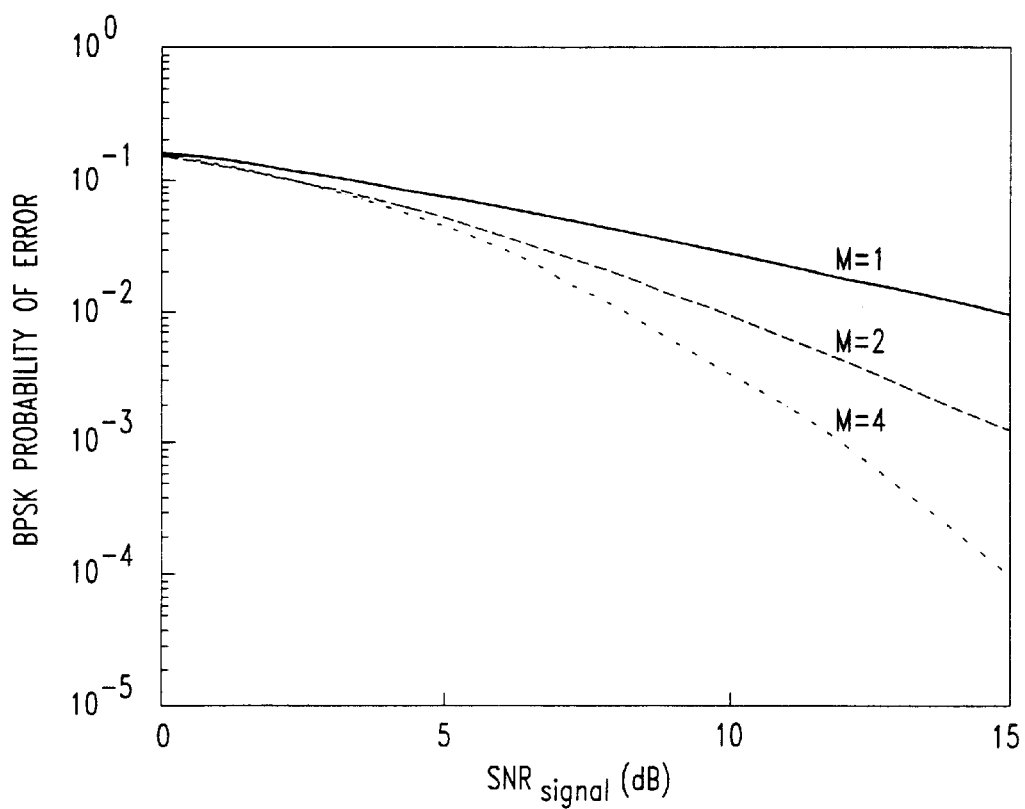
FIG. 8 is a graph showing the result of theoretical calculations of error probability versus expected signal-to-noise ratio, for signals communicated in accordance with techniques of the present invention.

FIG. 8 is a graph showing the result of theoretical calculations we have carried out of the BPSK probability of error, as a function of expected signal-to-noise ratio (SNR), when techniques of the kind described here are carried out. We assume that there is a pilot signal strong enough that its SNR is 10 decibels higher than the SNR of the received data signal. We carried out calculations for cases in which M, K, and L are all equal to, respectively, 1, 2, and 4. The total transmitted power is the same in each case.

By way of example, it is evident from the figure that going from one antenna to two antennas provides, under these conditions, at the 1% error-probability level, an effective gain in SNR of about five decibels, and going from one antenna to four antennas provides an effective gain of about seven decibels.

The invention claimed is:

1. A method of CDMA communication in which at least one group of two or more data symbols is to be collectively transmitted to two or more users in a user group such that each data symbol is destined for a particular user, wherein:

a) the method comprises, for each said group of data symbols and each said user group:

i) forming two or more signal sequences, wherein each signal sequence is formed by modulating information related to the data symbols onto spreading codes, and summing the modulated spreading codes; and ii) after modulation onto a carrier frequency, transmitting each of the signal sequences from a respective one of two or more transmitting antennas;

b) there is a group of two or more spreading codes common to all of the signal sequences; and c) each signal sequence is formed using all of the spreading codes in the common group.

2. The method of claim 1, wherein the formation of the signal sequences is described, at least in part, by the matrix product S=CB, wherein each column of matrix C is a distinct spreading-code sequence, matrix B has elements that are linearly related to data symbols or complex conjugates of data symbols, and the signal sequences are proportional to columns of matrix S.

3. The method of claim 2, wherein:

the elements of matrix B are arranged in M columns;

M is the number of transmitting antennas;

each column of matrix B is derivable from a vector b whose elements are the data symbols destined for respective users;

said derivation of column i, i=1, . . . , M, comprises taking a matrix product of the form $\ddot{A}_i b$; and matrices $\ddot{A}_i$, $\ddot{A}_j$, i=1, . . . , M, j=1, . . . , M, have the properties that for each value of i, the product $\ddot{A}_i^T \ddot{A}_i$ equals an identity matrix, and for each pair of values i, j for which i and j are unequal, the product $\ddot{A}_i^T \ddot{A}_j$ is a skew-symmetric matrix.

4. The method of claim 3, wherein each column of the matrix B is equal to a matrix product of the form $\ddot{A}_i b$.

5. The method of claim 3, wherein each column of the matrix B is derived from a matrix product of the form $\ddot{A}_i b$ by taking the complex conjugate of at least one element of said matrix product.

6. The method of claim 2, wherein each element of matrix B is a data symbol or a complex conjugate of a data symbol, multiplied by 1, −1, or 0.

7. The method of claim 2, wherein:

matrix B satisfies the expression $B^T B = (b_1^2 + \ldots + b_K^2) I$,

K is the number of users in the user group, $b_1, \ldots b_K$ are data symbols destined for respective users, and I is an identity matrix.

8. The method of claim 2, wherein there are two transmitting antennas, and the number of spreading codes equals the number of distinct data symbols in the group of data symbols.

9. The method of claim 2, wherein there are two transmitting antennas, $b_1$ and $b_2$ are data symbols, and $$B = \begin{bmatrix} b_1 & b_2 \\ b_2 & -b_1 \end{bmatrix}.$$

10. The method of claim 2, wherein there are four transmitting antennas, $b_1$, $b_2$, $b_3$, and $b_4$ are data symbols, and $$B = \begin{bmatrix} b_1 & b_2 & b_3 & b_4 \\ b_2 & -b_1 & b_4 & -b_3 \\ b_3 & -b_4 & -b_1 & b_2 \\ b_4 & b_3 & -b_2 & -b_1 \end{bmatrix}.$$

11. The method of claim 2, wherein there are three transmitting antennas, $b_1$, $b_2$, $b_3$, and $b_4$ are data symbols, and $$B = \begin{bmatrix} b_1 & b_2 & b_3 \\ b_2 & -b_1 & b_4 \\ b_3 & -b_4 & -b_1 \\ b_4 & b_3 & -b_2 \end{bmatrix}.$$

12. The method of claim 2, wherein there are two transmitting antennas, $b_1$ and $b_2$ are data symbols, and $$B = \begin{bmatrix} b_1 & b_2 \\ b_2^* & -b_1^* \end{bmatrix}.$$

13. The method of claim 2, wherein there are three transmitting antennas, $b_1$, $b_2$, and $b_3$ are data symbols, and $$B = \begin{bmatrix} b_1 & -b_2 & -b_3 \\ b_2^* & b_1^* & 0 \\ b_3^* & 0 & b_1^* \\ 0 & -b_3^* & b_2^* \end{bmatrix}.$$

14. The method of claim 1, wherein:

there are two or more user groups;

a distinct code group is assigned to each user group; and the method further comprises sending a respective group of data symbols to each user group using, for each user group, the corresponding code group.

15. A method of CDMA communication in which at least one data symbol is to be received from among a group of data symbols collectively transmitted from two or more transmitting antennas but each destined for a particular user, wherein:

a) The method comprises:

i) despreading a received and basebanded signal using a group of two or more conjugated spreading codes, resulting in a despread signal element for each of said conjugated codes; and ii) in a symbol recovery step, multiplying each signal element, or the complex conjugate of such element, by a respective coefficient and summing to form a linear combination of all of the despread signal elements or complex conjugates thereof;

b) each despread signal element comprises an additive factor related to the data symbol which is to be received, and further comprises additive factors related to data symbols which are destined for other users; and c) in the symbol recovery step, a set of coefficients is applied that drives the linear combination toward a value proportional to the data symbol to be received.

16. The method of claim 15, wherein:

the respective despread signal elements may be represented as elements of a despread signal vector;

the symbol recovery step is representable, at least in part, by multiplication of the despread signal vector, or a vector derived therefrom by complex conjugation of one or more elements thereof, by a further vector; and the further vector comprises elements, each said element linearly related to at least one fading coefficient relative to a transmitting antenna, or to a complex conjugate of at least one such fading coefficient.

17. The method of claim 16, wherein:

there is a matrix H such that the further vector is representable as a row of a matrix $H^\dagger$ that is the conjugate transpose of matrix H;

the elements of matrix H are arranged in K columns, K a positive integer;

each column of matrix H is derivable from a vector h whose elements are the fading coefficients relative to the respective transmitting antennas;

said derivation of column i, i=1, . . . , K, comprises taking a matrix product of the form $A_i h$; and matrices $A_i$, $A_j$, i=1, . . . , K, j=1, . . . , K, have the properties that for each value of i, the product $A_i^T A_i$ equals an identity matrix, and for each pair of values i, j for which i and j are unequal, the product $A_i^T A_j$ is a skew-symmetric matrix.

18. The method of claim 17, wherein each column of the matrix H is equal to a matrix product of the form $A_i h$.

19. The method of claim 17, wherein each column of the matrix H is derived from a matrix product of the form $A_i h$ by taking the complex conjugate of at least one element of said matrix product.

20. The method of claim 17, wherein there are two transmitting antennas, and the further vector is representable as a row of the conjugate transpose of the matrix $$H = \begin{bmatrix} h_1 & h_2 \\ -h_2 & h_1 \end{bmatrix}.$$

21. The method of claim 17, wherein there are four transmitting antennas, and the further vector is representable as a row of the conjugate transpose of the matrix $$H = \begin{bmatrix} h_1 & h_2 & h_3 & h_4 \\ -h_2 & h_1 & -h_4 & h_3 \\ -h_3 & h_4 & h_1 & -h_2 \\ -h_4 & -h_3 & h_2 & h_1 \end{bmatrix}.$$

22. The method of claim 17, wherein there are three transmitting antennas, and the further vector is representable as a row of the conjugate transpose of the matrix $$H = \begin{bmatrix} h_1 & h_2 & h_3 & 0 \\ -h_2 & h_1 & 0 & h_3 \\ -h_3 & 0 & h_1 & -h_2 \\ 0 & -h_3 & h_2 & h_1 \end{bmatrix}.$$

23. The method of claim 17, wherein there are two transmitting antennas, and the further vector is representable as a row of the conjugate transpose of the matrix $$H = \begin{bmatrix} h_1 & h_2 \\ -h_2^* & h_1^* \end{bmatrix}.$$

24. The method of claim 17, wherein there are three transmitting antennas, and the further vector is representable as a row of the conjugate transpose of the matrix $$H = \begin{bmatrix} h_1 & -h_2 & -h_3 \\ h_2^* & h_1^* & 0 \\ h_3^* & 0 & h_1^* \\ 0 & h_3^* & -h_2^* \end{bmatrix}.$$

25. The method of claim 16, wherein each element of the further vector is a fading coefficient or a complex conjugate of a fading coefficient, multiplied by 1, −1, or 0.

26. The method of claim 16, wherein:

there is a matrix H such that the further vector is representable as a row of a matrix $H^\dagger$ that is the conjugate transpose of matrix H;

matrix H satisfies the expression $H^T H = (h_1^2 + \ldots + h_M^2)I$;

M is the number of transmitting antennas;

$h_1, \ldots, h_M$ are the fading coefficients relative to the respective transmitting antennas; and I is an identity matrix.

27. The method of claim 15, wherein the symbol recovery step comprises multiplying each signal element by a respective coefficient and summing to form a linear combination of all of the despread signal elements.

28. The method of claim 15, wherein the symbol recovery step comprises taking the complex conjugate of at least one signal element, and forming a linear combination that includes at least one product of a coefficient times a conjugated despread signal element.

* * * * *